(12) United States Patent
Tolopka

(10) Patent No.: US 6,757,360 B1
(45) Date of Patent: Jun. 29, 2004

(54) METHOD AND APPARATUS FOR FILTERING INCOMING TELEPHONE CALLS

(75) Inventor: Stephen J. Tolopka, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/111,494

(22) Filed: Jul. 7, 1998

(51) Int. Cl.[7] .............................................. H04M 1/64
(52) U.S. Cl. ......................... 379/67.1; 379/70; 379/83; 379/88.07; 379/88.19; 379/88.2
(58) Field of Search ........................... 379/67.1, 70, 74, 379/76, 77, 79, 80, 83, 88.01, 88.02, 88.04, 88.07, 88.11, 88.19, 88.2, 88.21

(56) References Cited

U.S. PATENT DOCUMENTS

| | | | | |
|---|---|---|---|---|
| 5,394,445 A | * | 2/1995 | Ball et al. ................. | 379/88.21 |
| 5,471,522 A | | 11/1995 | Sells et al. ............... | 379/93.11 |
| 5,526,406 A | * | 6/1996 | Luneau ........................ | 455/463 |
| 5,594,784 A | * | 1/1997 | Velius .......................... | 379/88 |
| 5,644,629 A | * | 7/1997 | Chow .......................... | 379/142 |
| 5,652,789 A | * | 7/1997 | Miner et al. ................. | 379/201 |
| 5,883,942 A | * | 3/1999 | Lim et al. .................... | 379/142 |
| 6,005,870 A | * | 12/1999 | Leung et al. ............... | 370/466 |
| 6,021,181 A | * | 2/2000 | Miner et al. ............. | 379/88.23 |
| 6,031,899 A | * | 2/2000 | Wu ............................. | 379/142 |
| 6,229,878 B1 | * | 5/2001 | Moganti ..................... | 379/67.1 |

* cited by examiner

Primary Examiner—Allan Hoosain
(74) Attorney, Agent, or Firm—Blakely, Sokoloff, Taylor & Zafman LLP

(57) ABSTRACT

A technique for using a computer system to filter incoming telephone is provided. The computer system decodes caller ID information in an incoming telephone call and compares the decoded caller ID information against a stored list of caller ID information. If the caller ID information in the incoming call matches an item in the stored list, the computer system prevents the telephone input/output device from ringing, opens a connection on the telephone line, outputs a prerecorded audio message on the telephone line, and closes the connection. If the caller ID information in the incoming call does not match an item in the stored list, the computer system passes the incoming call to the input/output device normally. The computer system is configured to receive voice commands from a user to manage the stored list, including adding the caller ID information from a current or recent call to the list. The user may be located remotely from the computer system while inputting commands, and the user does not need to know the number of an incoming call to have it added to the list. Telephone numbers can also be added to the list automatically by the computer system by applying a set of specified conditions.

25 Claims, 8 Drawing Sheets

METHOD AND APPARATUS FOR FILTERING INCOMING TELEPHONE CALLS

FIELD OF THE INVENTION

The present invention pertains to telephony and computer systems. More particularly, the present invention relates to techniques for using a personal computer system to handle incoming telephone calls.

BACKGROUND OF THE INVENTION

Advancements in telephony thus far have not provided an adequate solution to a problem which telephone users have encountered since the birth of the technology—avoiding unwanted telephone calls. Consider the following scenario, which anyone who has a telephone has probably experienced: A person is at home eating dinner when the telephone rings. Because dinner time is a time of day when incoming telephone calls often are unwanted sales pitches, the person allows the answering machine to handle the call. After a few rings, the answering machine picks up, a brief period of silence ensues, and the call is disconnected. This scenario may be repeated a few minutes later, and then again a few minutes later, and so forth, much to the annoyance of the person, who is trying to eat his meal undisturbed.

Caller ID is a feature that is provided by telephone services and is sometimes useful for screening calls. However, even when caller ID information is available, a person receiving an incoming telephone call may not be familiar with the telephone number of the incoming call. That is often the case with unwanted calls, which often originate from an unfamiliar caller, as in the case of a telephone sales pitch. Telephone answering machines provide some filtering capability. However, aggressive telephone solicitors may call back repeatedly even after an answering machine has picked up, in the hope that a real person will eventually answer the telephone. Accordingly, what is needed is a technology that can easily and inexpensively be implemented n the home for enabling a person to conveniently filter out unwanted telephone calls.

SUMMARY OF THE INVENTION

The present invention includes a method and apparatus for managing a call filtering database. A telephone signal is received, and caller identification information in the telephone signal is identified. An entry is then created in the call filtering database based on the caller identification information.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A technique for filtering telephone calls in a computer system is described. As will be described in greater detail below, the technique includes using a personal computer (PC) or other processing system to filter out (reject) unwanted incoming telephone calls. Generally, the computer decodes caller ID information in an incoming telephone call and compares the decoded caller ID information against a stored list of caller ID information. If the caller ID information in the incoming call matches an item in the stored list, the computer prevents the telephone I/O device from ringing, opens a connection on the telephone line, outputs a prerecorded audio message on the telephone line, and closes the connection. If the caller ID information in the incoming call does not match an item in the stored list, the computer passes the incoming call to the I/O device normally. The computer may be configured to receive voice commands from a remote user to manage the stored list, including adding caller ID information from a current call to the list. The computer may also be configured to automatically add a telephone number to the stored list if the number meets a set of predetermined conditions.

Figure 1:
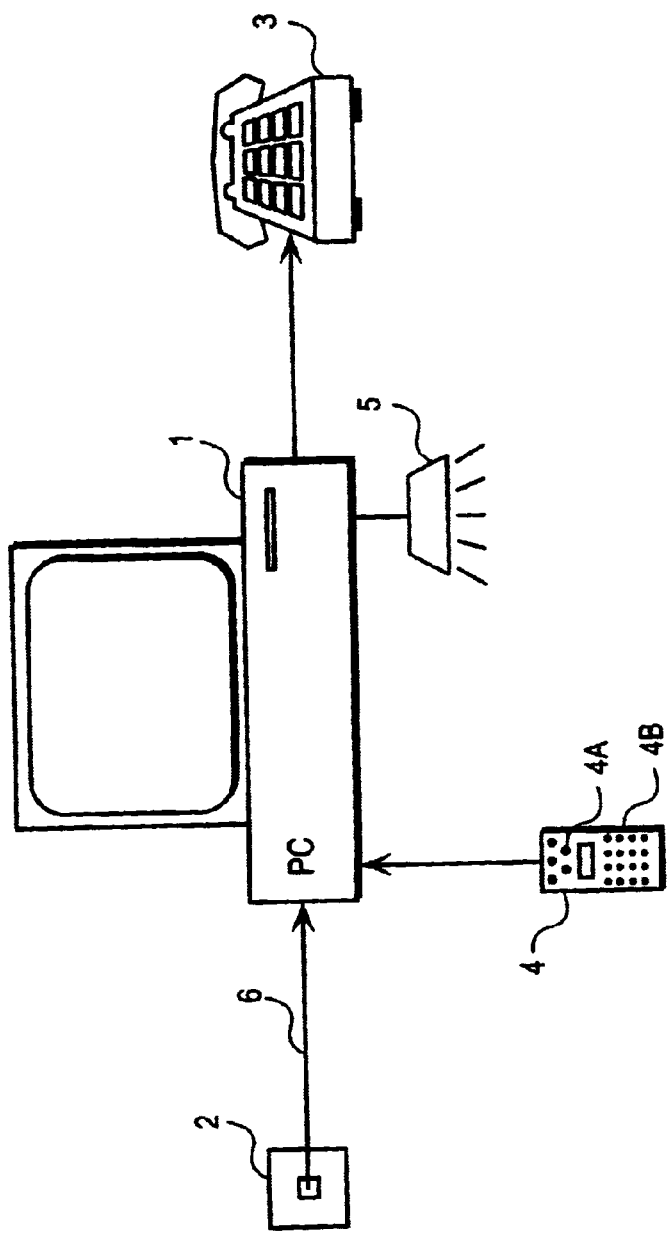
FIG. 1 illustrates a computer system connected to a telephone line and to a telephone handset.

FIG. 1 illustrates a computer system 1 connected for operation in accordance with the present invention. In the illustrated embodiment, computer system 1 is a conventional PC; however, in other embodiments, computer system 1 may be any of various other types of processing systems. Computer system 1 is connected to receive signals carrying incoming telephone calls via a conventional telephone line 6, which is connected to a telephone jack 2, and to selectively pass the incoming telephone signals to the telephone I/O device (in this case, a handset) 3. Note that telephone line 6 may be an analog or digital telephone link. Note also that in other embodiments, telephone line 6 may be replaced by other types of communication links capable of carrying telephone signals, such as an Internet data link, a cable television link, a videophone link, etc. The computer system 1 receives user commands from an input device 4. The input device 4, in the illustrated embodiment, includes a number of buttons or other similar manual controls 4A; a microphone input 4B, which a user can operate to control specific functions associated with the filtering of incoming telephone calls; and transmission components for transmitting signals to the computer system 1 over any suitable link. The link between the input device 4 and the computer system 1 may be a wireline link, or it may be a wireless link, such as an infrared (IR) link, a radio frequency (RF) link, or the like. In some embodiments, buttons 4A and microphone 4B may be located in separate physical devices, which may include conventional I/O devices that are commonly associated with conventional PCs (e.g., microphone/headset, keyboard, mouse, etc. Computer system 1 also includes one or more audio speakers 5 for outputting sound to a user; for example, the PC may include appropriate hardware and software to enable it to function as a telephone answering machine, such that the audio output from speaker 5 might include selected incoming telephone calls in real-time and recorded telephone messages. In certain embodiments, the speaker 5 and input device 4 may be physically integrated in a single device. This may be the case, for example, in an embodiment in which a cordless telephone handset or headset functions as both devices.

Figure 2:
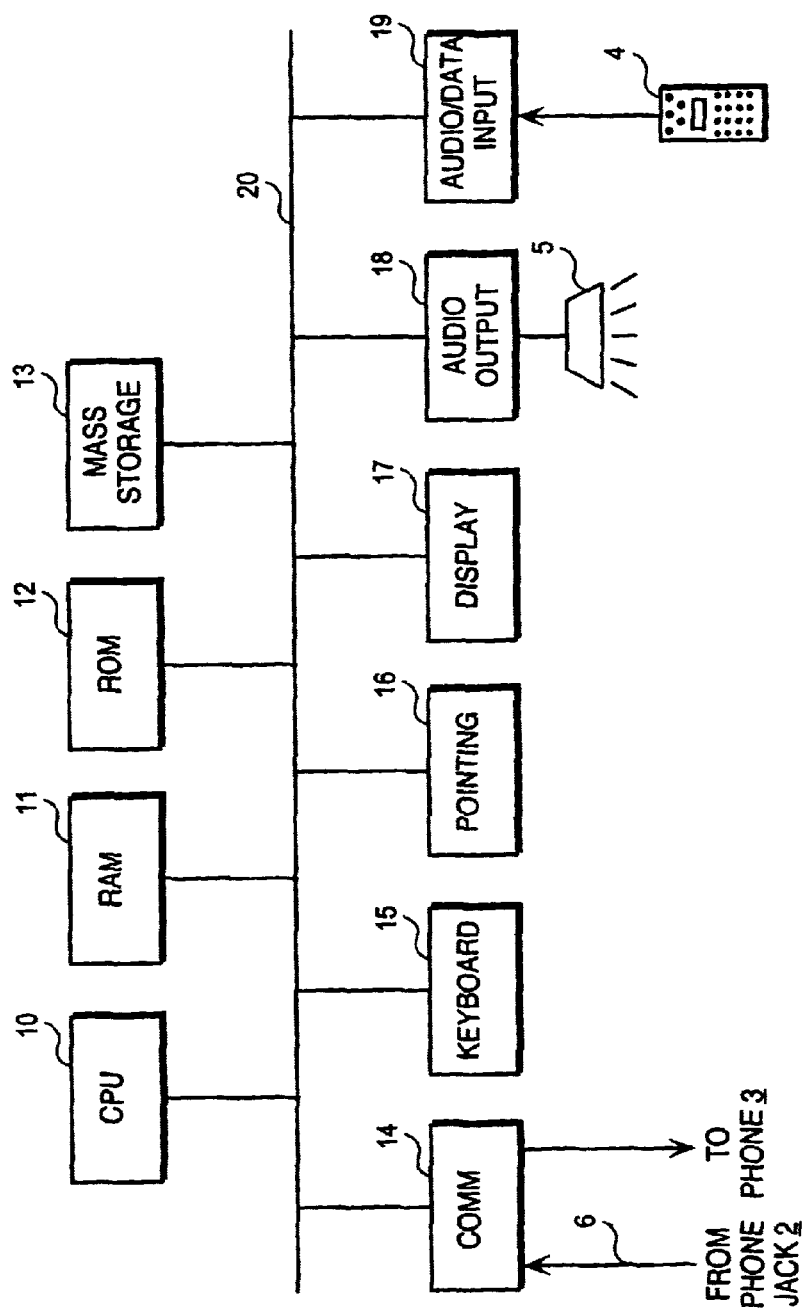
FIG. 2 illustrates a block diagram of the computer system of FIG. 1.

FIG. 2 illustrates the components of computer system 1, according to one embodiment. As shown, computer system 1 includes a central processing unit (CPU) 10, random access memory (RAM) 11, read-only memory (ROM) 12, and a mass storage device 13, each connected to a bus system 20. The bus system 20 may include one or more individual buses connected to each other through various bridges, controllers and/or adapters, such as are well-known in the art. For example, the bus system 20 may include a "system bus" that is connected through an adapter to one or more expansion buses, such as a Peripheral Component Interconnect (PCI) bus. Also coupled to the bus system 20 are a communication device 14, a keyboard 15, a pointing device 16, a display device 17, audio output circuitry 18, and audio/data input interface device 19. Audio output circuitry couples speaker 5 to bus system 20, while audio/data input circuitry 19 couples input device 4 to the bus system 20. If the connection between input device 4 and computer system 1 is wireless, circuitry 19 may also include an appropriate detector for detecting user input signals transmitted from input device 4. Note that certain embodiments, display device 17 or an additional display device may be integrated with input device 4.

Mass storage device 13 may include any suitable device for storing large volumes of data, such as a magnetic disk or tape, magneto-optical (MO) storage device, or any of various types of Digital Versatile Disk (DVD) or compact disk ROM (CD-ROM) storage. The pointing device 16 may be any suitable device for enabling a user to position a cursor or pointer on the display device 17, such as a mouse, trackball, touchpad, stylus with light pen, or the like. The display device 17 may include any suitable device for displaying alphanumeric, graphical and/or video data to a user, such as a cathode ray tube (CRT), a liquid crystal display (LCD), or the like, and associated controllers.

Communication device 14 represents well-known circuitry for enabling the computer system 1 to transmit and receive audio on telephone line 6. In addition, communication device 14 may also include a device suitable for communicating non-audio data with a remote computer system, such as a conventional telephone modem or the like.

As will be described below, aspects of the present invention may be embodied in software. That is, the present invention may be carried out in a computer system, such as computer system 1, in response to its CPU executing sequences of instructions contained in memory. The instructions may be executed from RAM, for example, and may be loaded from a persistent store, such as a mass storage device and/or from one or more other remote computer systems (collectively referred to as "host computer system"). In the latter case, a host computer system may transmit a sequence of instructions to the "target" computer system (e.g., computer system 1) in response to a message transmitted to the host computer system over a network by target computer system. As the target computer system receives the instructions via the network connection, the target computer system stores the instructions in memory. The target computer system may store the instructions for later execution or execute the instructions as they arrive over the network.

In some cases, the downloaded instructions may be directly supported by the CPU of the target computer system. Consequently, execution of the instructions may be performed directly by the CPU. In other cases, the instructions may not be directly executable by the CPU. Under those circumstances, the instructions may be executed by causing the CPU to execute an interpreter that interprets the instructions or by causing the CPU to execute instructions which convert the received instructions to instructions which can be directly executed by the CPU.

In various embodiments of the present invention, hardwired circuitry may be used in place of, or in combination with, software instructions to implement the present invention. Thus, the present invention is not limited to any specific combination of hardware circuitry and software, nor to any particular source for the instructions executed by a computer system.

An example will now be described of how the present invention can be applied. Assume that a user of the present invention is at home during dinner time. The user's home is equipped with computer system 1 and telephone 3, connected as shown in FIG. 1. The telephone 3 rings with an incoming call. Accordingly, the user allows computer system 1 to answer the telephone call using its built-in answering machine function. The answering machine function normally causes the caller's voice message to be output from speaker 5 in real-time. However, when the answering machine finishes playing its outgoing greeting, the user notes only silence from speaker 5, and the call is disconnected. Assuming the telephone call to be a sales pitch or some other unwanted call, the user picks up input device 4 and says, "Computer, ignore all future calls from the last number." This voice command is received by computer system 1 (e.g., via circuitry 19) and provided to a Telephone Management System (TMS) of the present invention.

The TMS may be embodied as a software application which executes on computer system 1; that is assumed to be the case in the remainder of this description in order to facilitate explanation. Note, however, that the TMS may alternatively be embodied in hardware or in a combination of hardware and software, as indicated above. The TMS has access to the number of the incoming telephone call from caller ID information within the incoming telephone signal.

Accordingly, the TMS recognizes and responds' to the voice command by adding the caller ID information (including telephone number) to a rejection list, which is maintained by the TMS. The rejection list includes the telephone numbers and/or other ID information of calls that are to be rejected (filtered) by the TMS. The TMS causes computer system 1 to respond to the command, through audio speaker 5, "Done. Future calls from 555-1234 will be summarily dismissed."

Two minutes later, the same caller calls again. In response, the TMS in computer system 1 automatically detects the incoming telephone number using the caller ID information, checks it against the stored rejection list, and finds a match. As a result, the TMS answers the call, outputs a prerecorded message of the user's choice on the telephone line 6 that essentially tells the caller to "go away", and then hangs up (disconnects the call). Importantly, the TMS prevents the telephone 3 from ringing in response to this second call.

Thus, because user commands are entered through the input device 4, which may be remote to the computer system 1, the user is not required to remain at the computer system 1 to interact with the TMS and/or to access the call filtering database. Moreover, the user does not need to see or know the number of the call that is to be added to the rejection list (although he easily may see the number, if he so desires); the computer system determines the number automatically from the Caller ID information.

Figure 3:
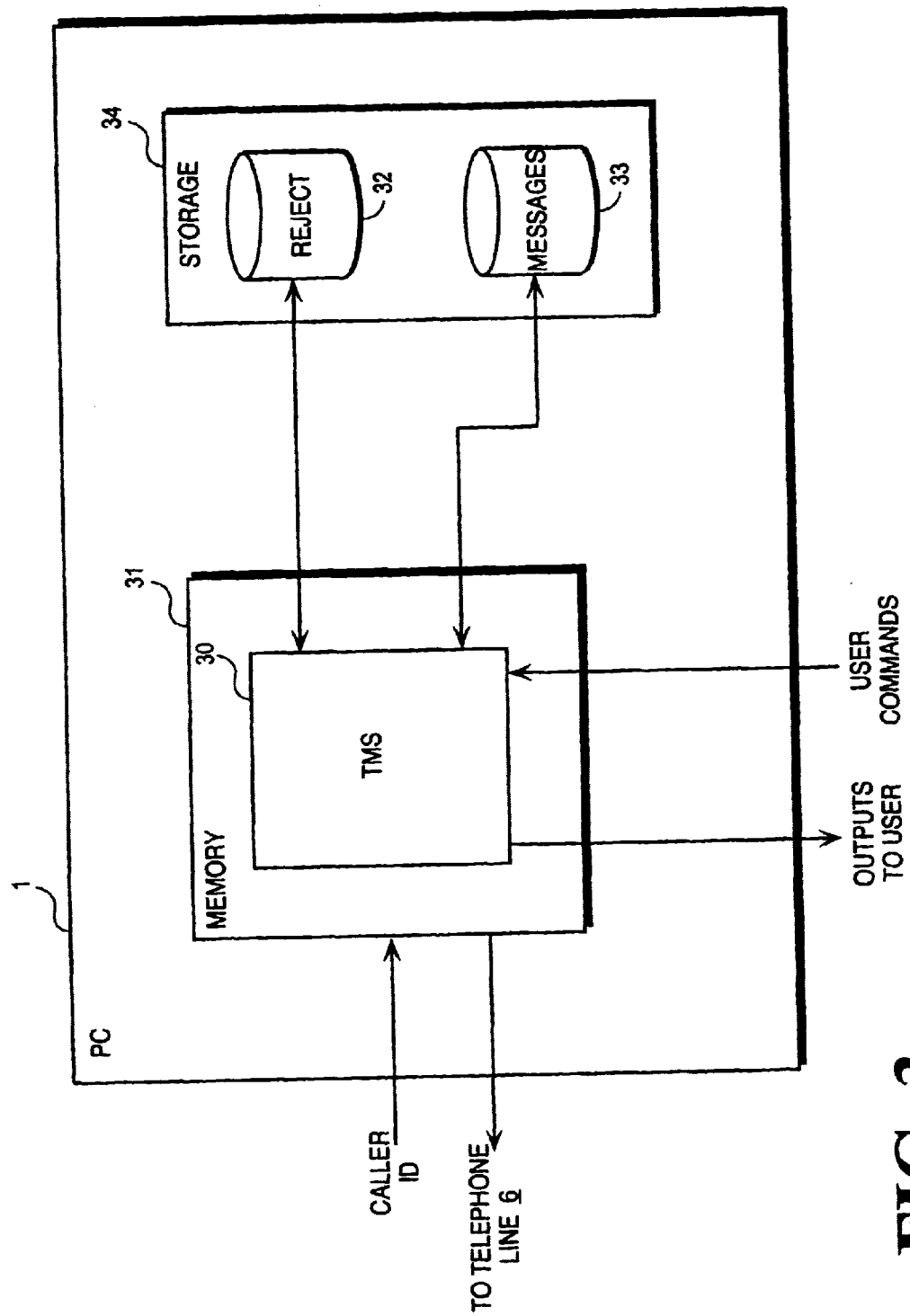
FIG. 3 is a block diagram illustrating a telephone management system (TMS) configured to access a stored rejection list and prerecorded messages in a personal computer.

FIG. 3 illustrates an embodiment of the TMS of the present invention. As shown, the TMS 30 is stored in memory 31 within computer system 1. Memory 31 may represent, for example, RAM 11, mass storage device 13, or a combination of those devices. The TMS 30 is configured to receive caller ID information from an incoming telephone call and to receive user commands input from input device 4 or any other I/O devices associated with computer system 1, and is further configured to output visual and/or audio information to the user via speaker 5 and/or display device 17, respectively. The TMS 30 is also configured to control the telephone line, so as to allow or inhibit ringing of the telephone 3 in response to an incoming call, to answer telephone calls, and to output prerecorded messages to the caller. The TMS 30 is further configured to access a rejection database 32 and an audio messages database 33, which are maintained in storage area 34 within computer system 1. Storage area 34 may represent, for example, mass storage device 13, RAM 11, or a combination of those devices. As noted above, the rejection database 32 may be a simple list of telephone numbers (and is henceforth referred to as such) acquired from caller ID information in previously received telephone calls. The rejection list 32 also may include other information, which may or may not be derived from caller ID information. For example, the rejection list 32 may include telephone numbers entered directly by a user; an indication of which outgoing message to play in response to a call from a given number; or an indication of the bounds that define a bank of telephone numbers around a given rejected call. Techniques for identifying banks of telephone numbers are discussed below.

When an incoming telephone call is received by computer system 1, the TMS 20 compares caller ID information in the call to the information stored in the rejection list 32 and, if there is a match, prevents the telephone signal from being passed to the telephone 3.

User commands received by the TMS 30 can be used to update information in the rejection list 32 and/or prerecorded audio messages 33, among other functions. It should be noted that although voice commands may be used to control the TMS 30, user inputs can also be input to the TMS 30 using other, more conventional techniques, such as through a keyboard, mouse, etc. In addition, voice commands and/or conventional user inputs may be used to control various other functions of the TMS 30, such as the setting of user preferences and configuration parameters.

Figure 4:
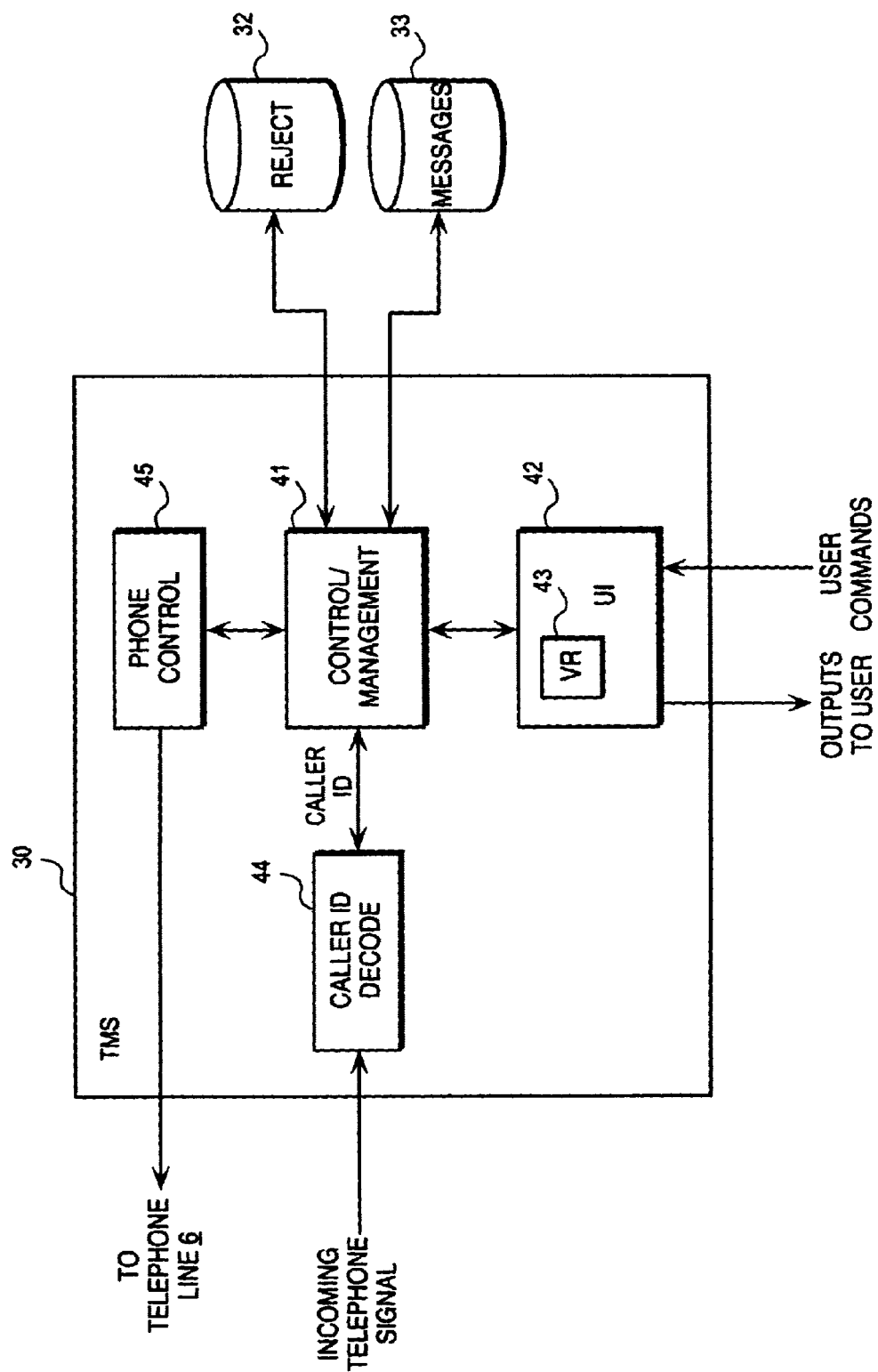
FIG. 4 is a block diagram illustrating components of the TMS of FIG. 3 in greater detail.

FIG. 4 is a block diagram showing the TMS 30 in greater detail. In the illustrated embodiment, the TMS 30 includes a control/management unit 41, a user interface unit 42, a caller ID decoder 44, and a telephone control unit 45. The user interface unit 42 is configured to receive and process user inputs, which may be conventional user inputs or voice inputs. Hence, the user interface unit 42 also includes a voice recognition (VR) component 43 for processing voice commands from the user. The user interface unit 42 is further configured to provide outputs to the user in the form of text, graphics, audio, video, or a combination thereof. The audio output may include synthesized or recorded speech, as indicated by the situation described above.

The user interface unit 42 is configured to communicate with the control/management unit 41, which controls the overall operation of the TMS 30. The caller ID decoder 44 receives the incoming telephone signal, decodes the caller ID information in the incoming signal, and provides the caller ID information to the control and management unit 41. The control management unit 41 compares the telephone number indicated by the caller ID information to telephone numbers stored in the rejection database 32. The control/management unit 41 is also configured to communicate with the telephone control unit 45, which controls the telephone line. In particular, the telephone control unit 45 opens the connection on the telephone line when appropriate, such as when invoking the answering machine function and/or outputting a rejection message. In addition, the telephone control unit 45 is used to selectively pass the telephone signal through to the telephone 3, including controlling the operation of communication device 14 (FIG. 2).

Figure 5:
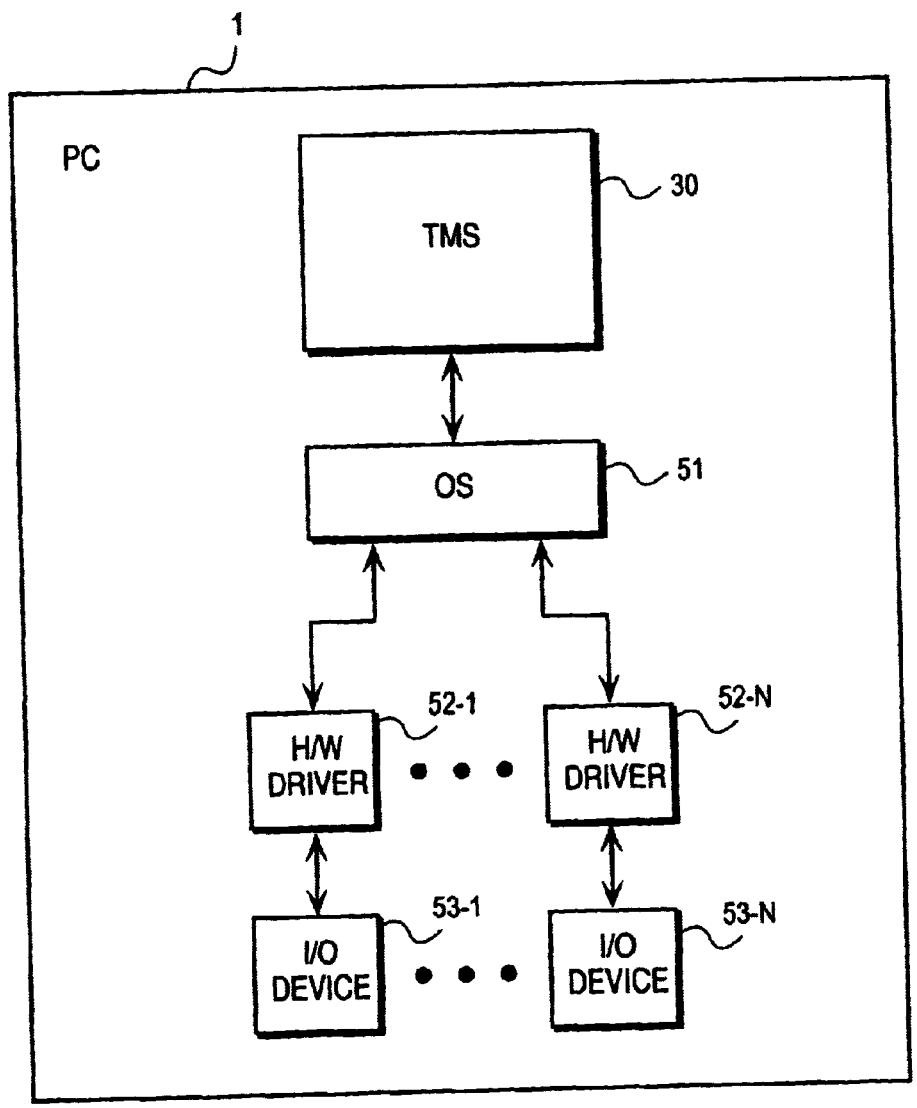
FIG. 5 is a block diagram illustrating relationships between the TMS and the operating system and hardware in a computer system.

As noted above, the TMS 30 may be embodied as application software that executes on the computer system 1. Accordingly, FIG. 5 illustrates the relationships between the TMS 30 and other components of the computer system 1 for one such embodiment. Specifically, the TMS 30 operates (logically) "on top of", and communicates with, the operating system 51 of computer system 1. The operating system 51, in turn, communicates with the various hardware drivers 52-1 through 52-N of computer system 1, which are used to control input I/O devices 53-1 through 53-N, respectively. I/O devices 53-1 through 53-N may represent, for example, communication device 14, keyboard 15, pointing device 16, display device 17, speaker 5, etc.

Figure 6:
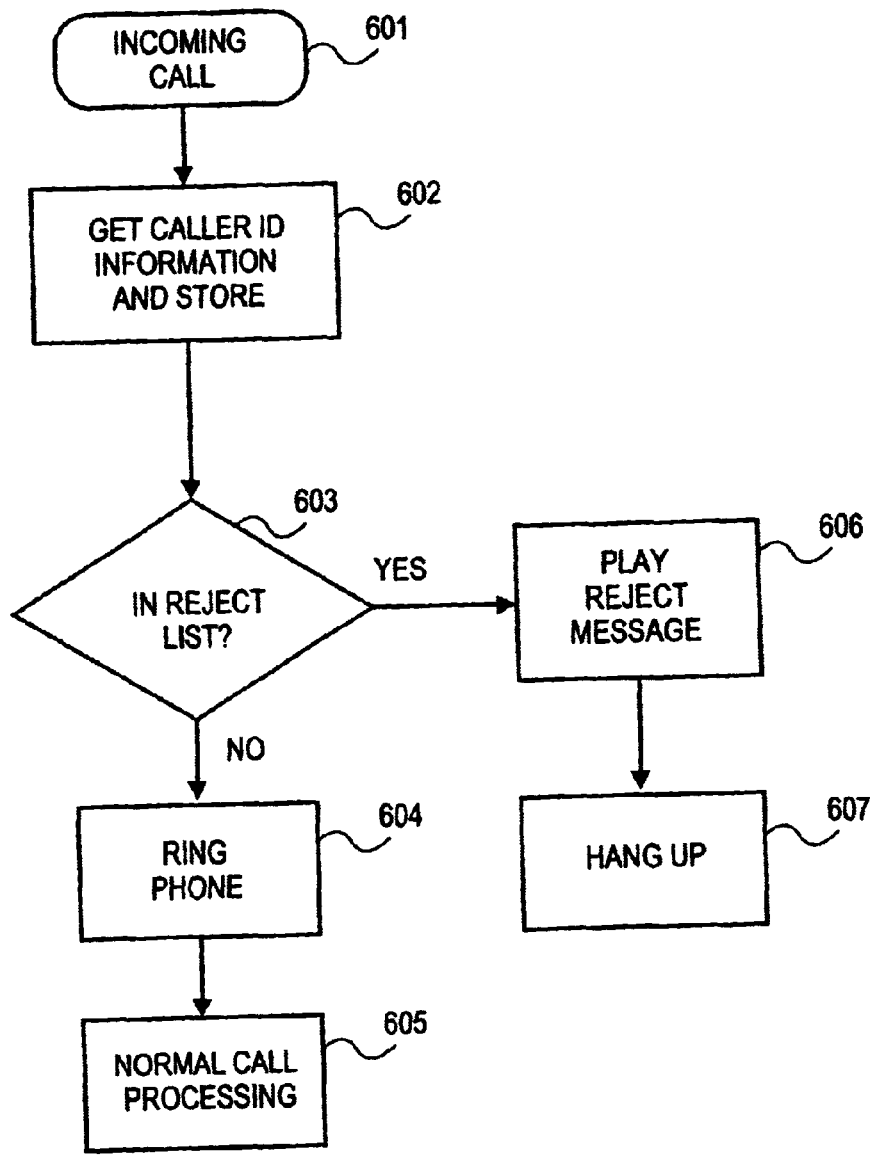
FIG. 6 is a flow diagram illustrating a routine for handling an incoming telephone call according to the present invention.

FIG. 6 illustrates an overall routine for handling an incoming call in accordance with the present invention. At 601 an incoming telephone call is received by the computer system 1. In response, the TMS 30 obtains the caller ID information in the incoming call and stores that information for future use at 602. At 603 the TMS 30 determines whether the telephone number in the received caller ID information matches a telephone number in the stored rejection list 32. If so, then at 606 TMS 30 outputs a prerecorded rejection message to the caller from the message database 33, and then hangs up at 607 (terminates the call). If the caller ID information in the incoming call does not match an item in the rejection list at 603, then at 604 the TMS 30 allows the telephone 3 to ring, and the telephone call is processed normally at 605.

Figure 7:
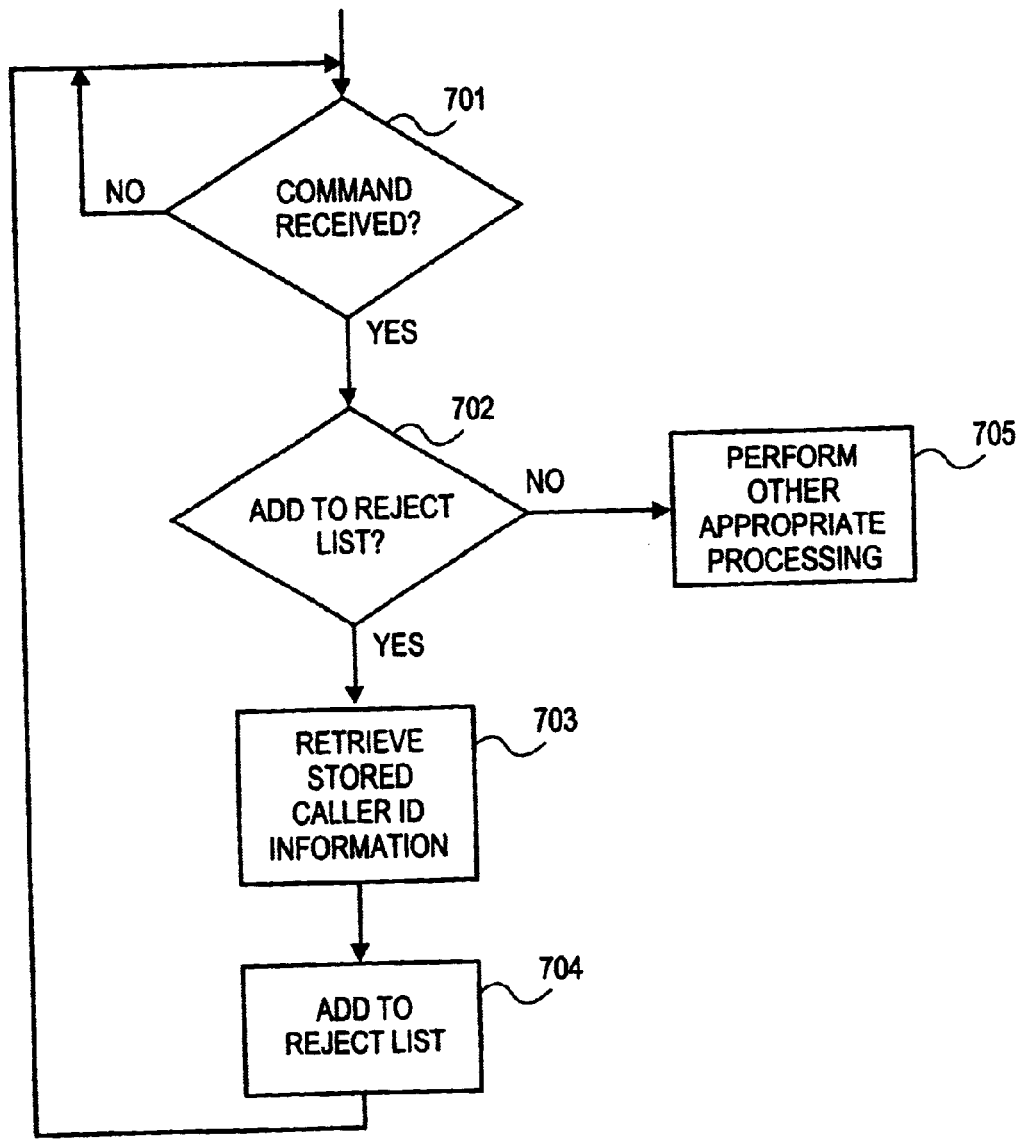
FIG. 7 is a flow diagram illustrating a routine for handling a user command according to the present invention.

At noted above, the TMS 30 is configured to receive and respond to various types of user inputs, including inputs for maintaining and updating the rejection list 32. For example, a user may command the TMS 30 to add the telephone number of a current incoming telephone call or the most recently received call to the rejection list 32. FIG. 7 illustrates a routine for responding to such a user command. If a command is received at 701, then at 702 the TMS 30 determines whether the command is a command to add caller ID information to the rejection list. If so, then at 703 the TMS 30 retrieves the caller ID information, which was automatically stored when the incoming telephone call was received, and adds it to the rejection list at 704. The routine then repeats from 701. If the command was not for adding information to the rejection list 32, then at 705 other appropriate processing functions are performed, as specified by the command.

Figure 8:
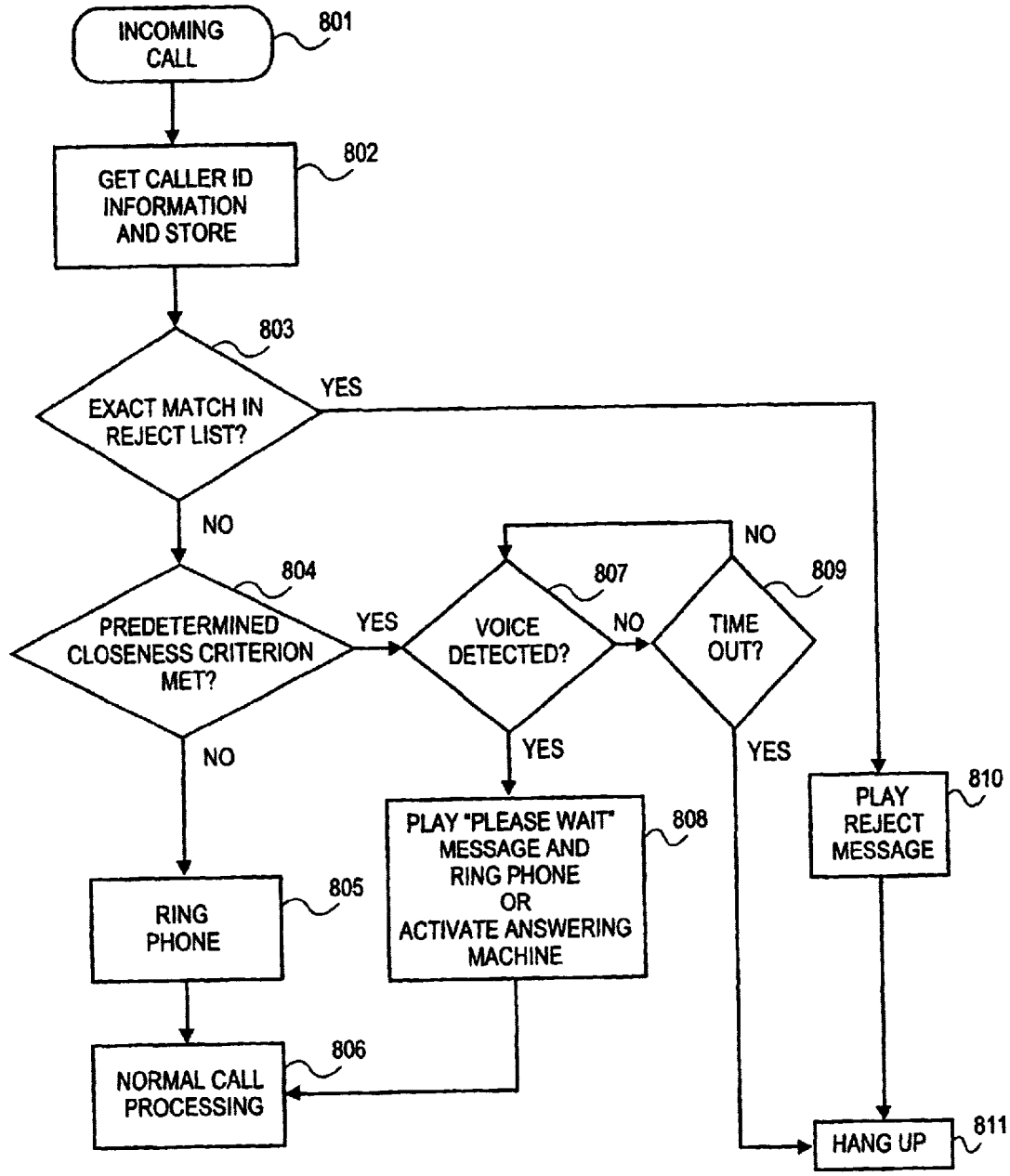
FIG. 8 is a flow diagram illustrating a routine for handling an incoming call that may originate from a common bank of telephone numbers.

Various optional features may be provided in the TMS 30 to improve its overall operation. For example, the TMS 30 may be configured to correctly handle calls originating from a bank of telephone numbers. For example, if the rejection list contains an entry, such as 555-1234, and a call is received from 555-1235, it is very possible that these calls originate from the same calling entity (e.g., a business). Accordingly, it may be desirable to reject the second call, particularly if the second call occurs shortly after the initial call with the similar telephone number. Accordingly, FIG. 8 illustrates a routine performed by the TMS 30 for responding to telephone calls that may originate from a common bank of telephone numbers.

At 801 an incoming call is received. At 802 the TMS 30 obtains and stores the caller ID information in the incoming call. At 803, the TMS 30 determines whether the telephone number of the incoming call exactly matches an item in the stored rejection list 32. If so, the appropriate prerecorded rejection message is played to the caller at 810, and the TMS 30 hangs up at 811 without allowing the telephone 3 to ring. If there was no exact match at 803, then at 804 the TMS 30 determines whether the telephone number of the incoming call meets a predetermined closeness criterion with respect to a number stored in the rejection list 32. This may involve, for example, determining whether a predetermined number of leading digits in the incoming telephone number match the corresponding digits of a telephone number in the rejection list 32. The predetermined number of digits may include, for example, all of the digits in the telephone number except the last one or two digits. As another example, the determination of 804 may involve determining whether the telephone number of the incoming call is within n digits of a number stored in the rejection list 32 (where n is an integer). For example, if n were chosen to be 6 for a stored telephone number, 555-1234, the system would reject telephone numbers 555-1228 through 555-1240.

Thus, if the predetermined closeness criterion is not met at 804, then the TMS 30 allows the telephone 3 to ring at 805, and the call is processed normally at 806. If the closeness criterion is met at 804, then at 807 and 809 the TMS 30 attempts to detect voice in the incoming telephone call until the expiration of a predetermined time-out period. If voice is detected before the time-out expires, then at 808 the TMS 30 plays an outgoing message that essentially says, "please wait", and rings the telephone 3; alternatively (depending on the user's specified preferences), the TMS 30 may activate the answering machine function at 808. The call is then processed normally at 806. If no voice is detected before the time-out period expires, then at 811 the TMS 30 hangs up the telephone 11 without allowing the telephone 3 to ring.

The TMS 30 may also be configured to apply various "rules", or conditions, to allow telephone numbers to be added to a rejection list without human intervention. Such rules can be created to increase the likelihood of rejecting unwanted calls while reducing the likelihood of rejecting wanted calls (e.g., calls from friends, family, etc.). The following are simple examples of possible sets of conditions that may be applied by the TMS 30:

1) If an unanswered call is received from the same number or bank of telephone numbers n or more times within an m minute period, add the telephone number to the rejection list;
2) If an unanswered call is received from the same number or bank of telephone numbers n or more times, and the caller does not leave a message, add the telephone number to the rejection list;
3) If an unanswered call is received from the same number or bank of telephone numbers n or more times, and the number is not in a list of "accept" telephone numbers (i.e., family, friends, etc.), add the telephone to the rejection list.

In addition, the TMS 30 may provide the capability to create a log of telephone numbers that have been automatically added to the rejection list, so that the user can audit the TMS's decisions.

Various other features may also be included in a TMS of the present invention to improve its operation. Examples of such features are functions that enable the user to review and modify the rejection list 32, remove telephone numbers from the rejection list, allow entries to expire after a user-specified time period, etc.

Thus, a method and apparatus for filtering telephone calls in a computer system have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of managing a call filtering database in a processing system configured to receive telephone calls, the method comprising:
   receiving a telephone signal for an incoming telephone call;
   identifying caller identification information in the telephone signal;
   automatically determining whether the caller identification information corresponds to caller identification information stored in the call filtering database in response to receiving the telephone signal, including determining whether the telephone call originates from a bank of related telephone numbers; and
   creating an entry in the call filtering database based on the caller identification information.

2. A method according to claim 1, wherein said creating an entry in the call filtering database comprises:
   in response to receiving the telephone signal, automatically applying a set of conditions; and
   automatically creating the entry in the call filtering database, based on the caller identification information, in response to the set of conditions being satisfied.

3. A method according to claim 1, further comprising:
   receiving a user command from an input device;
   wherein said creating an entry in the call filtering database comprises creating the entry in the call filtering database based on the caller identification information in response to receiving the user input.

4. A method according to claim 3, wherein said receiving a user command from an input device comprises receiving the user command from a remotely located input device.

5. A method according to claim 3, wherein the user command is a voice command input via the input device.

6. A method according to claim 1, wherein said creating an entry in the call filtering database comprises automatically creating an entry in the call filtering database based on the caller identification information, without requiring said caller identification information to be input by a user.

7. A method according to claim 1, further comprising inhibiting a telephone input/output device from ringing if the caller identification information corresponds to an item in the call filtering database.

8. A method according to claim 1, further comprising:
   inhibiting a telephony end user device from notifying a user in response to the telephone call if the caller identification information corresponds to caller identification information stored in the call filtering database and the telephone call is determined to originate from a bank of related telephone numbers.

9. A processing system comprising:
a processor;
a communication device coupled to the processor and configured to receive a telephone signal for an incoming telephone call;
an input interface coupled to the processor and configured to receive user inputs form a remote input device;
a first storage unit coupled to the processor and storing a call filtering database; and
a second storage unit coupled to the processor and storing sequences of instructions which, when executed by the processor, case the processing system to:
receive the telephone signal;
decode caller identification information in the telephone signal;
determine whether the telephone call originates from a bank of associated telephone numbers by testing for exact matching and a predetermined closeness criterion based on the caller identification information; and
create an entry in the call filtering database based on the caller identification information.

10. A processing system according to claim 9, wherein the sequences of instructions further comprise instructions which, when executed by the processor, cause the processing system to;
automatically apply a set of conditions in response to receiving the telephone signal; and
automatically create the entry in the call filtering database, based on the caller identification information, in response to a specified outcome of applying the conditions.

11. A processing system according to claim 9, wherein the sequences of instructions further comprise instructions which, when executed by the processor, cause the processing system to:
receiving a user command from the input device; and
create the entry in the call filtering database based on the caller identification information in response to the user input.

12. A processing system according to claim 9, wherein the sequences of instructions further comprise instructions which, when executed by the processor, cause the processing system to automatically determine whether the caller identification information corresponds to caller identification information stored in the call filtering database in response to receiving the telephone signal.

13. A processing system according to claim 12, wherein the sequences of instructions further comprise instructions which, when executed by the processor, cause the processing system to inhibit a telephone input/output device from ringing if the caller identification information corresponds to an item in the call filtering database.

14. A processing system according to claim 9, wherein the sequences of instructions further comprise instructions which, when executed by the processor, cause the processing system to create an entry in the call filtering database based on the caller identification, without requiring said caller identification information to be input by a user.

15. A processing system according to claim 9, wherein the sequences of instructions further comprise instructions which, when executed by the processor, cause the processing system to:
inhibit the communication device from notifying a user in response to the telephone signal if the caller identification information corresponds to caller identification information stored in the call filtering database and the telephone call is determined to originate from a bank of related telephone numbers.

16. An apparatus for managing a call filtering database, the apparatus comprising:
means for receiving a telephone signal for an incoming telephone call;
means for decoding caller identification information in the telephone signal;
means for automatically determining whether the caller identification information corresponds to caller identification information stored in the call filtering database by testing for exact matching and predetermined closeness criterion, in response to receiving the telephone signal, including means for determining whether the telephone call originates from a bank of related telephone numbers; and
means for creating an entry in the call filtering database based on the caller identification information.

17. An apparatus according to claim 16, wherein the means for creating an entry in the call filtering database comprises:
means for automatically applying a set of conditions in response to receiving the telephone signal; and
means for automatically adding the caller identification information to the call filtering database in response to the set of conditions being met.

18. An apparatus according to claim 17, further comprising means for maintaining a log indicating which caller identification information has been automatically added to the call filtering database in response to the set of conditions being met.

19. An apparatus according to claim 18, wherein the user command is a voice command input via the input device.

20. An apparatus according to claim 18, wherein the means for receiving a user command from an input device comprises means for receiving the user command from a remotely located input device.

21. An apparatus according to claim 16, further comprising means for enabling a user to modify the call filtering database.

22. An apparatus according to claim 16, further comprising:
means for receiving a user command from an input device;
wherein the means for creating an entry in the call filtering database comprises means for creating the entry in the call filtering database based on the caller identification information in response to receiving the user input.

23. An apparatus according to claim 16, further comprising means for inhibiting a telephone input/output device from ringing if the caller identification information corresponds to an item in the call filtering database.

24. An apparatus according to claim 16, wherein the caller identification information comprises Caller ID information including a telephone number.

25. An apparatus according to claim 16, further comprising:
means for inhibiting a telephony end user device from notifying a user in response to the telephone signal if the caller identification information corresponds to caller identification information stored in the call filtering database and the telephone call is determined to originate from a bank of related telephone numbers.

* * * * *